United States Patent
Yang et al.

(10) Patent No.: US 9,918,271 B2
(45) Date of Patent: Mar. 13, 2018

(54) OPTIMIZED BARRED TIMER HANDLING IN HIGH-SPEED SCENARIO

(71) Applicant: QUALCOMM Incorporated, San Diego, CA (US)

(72) Inventors: Ming Yang, San Diego, CA (US); Hui Zhao, San Diego, CA (US); Long Duan, San Diego, CA (US); Mukesh Kumar Mittal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 14/630,952

(22) Filed: Feb. 25, 2015

(65) Prior Publication Data

US 2016/0249275 A1 Aug. 25, 2016

(51) Int. Cl.
| | |
|---|---|
| H04W 48/04 | (2009.01) |
| H04W 36/08 | (2009.01) |
| H04W 48/20 | (2009.01) |
| H04W 36/00 | (2009.01) |
| H04W 36/32 | (2009.01) |
| H04W 48/08 | (2009.01) |

(52) U.S. Cl.
CPC .......... *H04W 48/04* (2013.01); *H04W 36/08* (2013.01); *H04W 48/20* (2013.01); *H04W 36/0055* (2013.01); *H04W 36/32* (2013.01); *H04W 48/08* (2013.01)

(58) Field of Classification Search
CPC ...... H04W 48/04; H04W 48/02; H04W 36/08
USPC .............................................. 455/441, 422.1
See application file for complete search history.

(56) References Cited

U.S. PATENT DOCUMENTS

| | | | |
|---|---|---|---|
| 7,483,702 B2 * | 1/2009 | Yeo | H04W 36/0061 455/436 |
| 2010/0074170 A1 | 3/2010 | Chen | |
| 2013/0210435 A1 | 8/2013 | Dimou | |
| 2014/0045498 A1 | 2/2014 | Choi et al. | |
| 2014/0099969 A1 | 4/2014 | Hwang et al. | |
| 2014/0128029 A1 | 5/2014 | Fong et al. | |
| 2014/0171096 A1 | 6/2014 | Hwang et al. | |

(Continued)

FOREIGN PATENT DOCUMENTS

| | | | | |
|---|---|---|---|---|
| WO | WO 2016/018542 | * | 6/2015 | ............ H04W 48/02 |
| WO | 2016/018542 | * | 2/2016 | ............ H04W 48/02 |

OTHER PUBLICATIONS

3GPP TS 36.355, LTE Positioning Protocol (Dec. 2014).*

(Continued)

*Primary Examiner* — Vladimir Magloire
*Assistant Examiner* — Donald H Braswell
(74) *Attorney, Agent, or Firm* — Loza & Loza, LLP

(57) ABSTRACT

Aspects of the present disclosure are directed to a moving user equipment (UE) or an application operable in a wireless communications network and methods in which an apparatus for wireless communication is configured to adaptively adjust a barred time for the moving UE by obtaining a dynamic characteristic of the moving UE; adjusting the barred time associated with the moving UE based on the dynamic characteristic to yield an adjusted barred time; applying the adjusted barred time to a resource management protocol; and executing the resource management protocol in a first wireless network in accordance with the adjusted barred time to access a first cell in the first wireless network.

23 Claims, 10 Drawing Sheets

(56) References Cited

U.S. PATENT DOCUMENTS

| | | | |
|---|---|---|---|
| 2014/0248874 A1 | 9/2014 | Zhang et al. | |
| 2014/0293918 A1* | 10/2014 | Vujcic | H04W 74/0866 370/329 |
| 2015/0245261 A1* | 8/2015 | Teyeb | H04W 36/0083 455/437 |
| 2016/0112826 A1* | 4/2016 | Brisebois | H04W 4/008 455/41.1 |

OTHER PUBLICATIONS

"Continuous Functions" The Math Page: An Approach to Calculus, accessed May 26, 2017 at <http://www.themathpage.com/acalc/continuous-function.htm>.*

Cassidian (Airbus Defence & Space): "Further Investigations on Cell Barring due to Reception Failure of MIB or SIBI," 3GPP Draft; R2-145146, 3rd Generation Partnership Project (3GPP), Mobile Competence Centre; 650, Route Des Lucioles; F-06921 Sophia-Antipolis Cedex; France, vol. RAN WG2, no. San Francisco, USA; Nov. 17-21, 2014, 7 Nov. 2014, XP050886569, Retrieved from the Internet URL: http://www.3gpp.org/ftp/tsg_ran/WG2_RL2/TSGR2_88/Docs/, retrieved on Nov. 7, 2014, the whole document.

EADS: "Impact of Public Safety Use Case on the cell Barring Mechanism," 3GPP Draft; R2-140399, 3rd Generation Partnership Project (3GPP), Mobile Competence Centre; 650, Route DES Lucioles; F-06921 Sophia-Antipolis Cedex; France, vol. RAN WG2, No. Prague, Czech Republic; Feb. 10-14, 2014, Feb. 9, 2014, XP050791775, Retrieved from the Internet URL: http://www.3gpp.org/ftp/Meetings_3GPP_SYNC/RAN2/Docs/, [retrieved on Feb. 9, 2014], the whole document.

International Search Report and Written Opinion—PCT/US2016/0014959—ISA/EPO—May 10, 2016.

* cited by examiner

OPTIMIZED BARRED TIMER HANDLING IN HIGH-SPEED SCENARIO

TECHNICAL FIELD

Aspects of the present disclosure relate generally to wireless communication systems, and more particularly, to wireless network handover of a user equipment in a high speed scenario.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the wireless communication technologies not only to meet the growing demand for mobile broadband access, but to advance and enhance the user experience with mobile communications. An example of an emerging telecommunication standard is the evolved UTRAN (eUTRAN), also sometimes referred to as Long Term Evolution (LTE). LTE is a set of enhancements to the UMTS mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. Therefore, it is desirable that a user equipment is operable in multiple radio access networks, for example, the UTRAN as well as the eUTRAN, and that there be an optimization in adjusting a barred time for access from one wireless network to another.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to a user equipment (UE), a radio network controller (RNC), or a remote server operable in a wireless communications network and methods in which wireless network handover may be avoided or reduced during a scenario with a UE traveling at high speed.

In various aspects, the present disclosure provides a method for controlling wireless network handover for a moving user equipment (UE). The method includes adjusting a barred time associated with the moving UE, including: using a receiver to obtain a dynamic characteristic of the moving UE; adjusting the barred time associated with the moving UE based on the dynamic characteristic to yield an adjusted barred time; applying the adjusted barred time to a resource management protocol; and executing the resource management protocol in a first wireless network in accordance with the adjusted barred time to access a first cell in the first wireless network.

In various aspects, an apparatus for adjusting a barred time associated with a moving user equipment (UE), includes a receiver for obtaining a dynamic characteristic of the moving UE; a processing circuit coupled to the receiver, wherein the processing circuit performs the following: adjusting the barred time associated with the moving UE based on the dynamic characteristic to yield an adjusted barred time; applying the adjusted barred time to a resource management protocol; and executing the resource management protocol in a first wireless network in accordance with the adjusted barred time to access a first cell in the first wireless network; and a storage medium coupled to the processing circuit, wherein the storage medium stores a plurality of codes for executing the resource management protocol.

In various aspects, an apparatus for adjusting a barred time associated with a moving user equipment (UE), includes means for obtaining a dynamic characteristic of the moving UE; means for adjusting the barred time associated with the moving UE based on the dynamic characteristic to yield an adjusted barred time; means for applying the adjusted barred time to a resource management protocol; and means for executing the resource management protocol in a first wireless network in accordance with the adjusted barred time to access a first cell in the first wireless network.

In various aspects, a computer-readable storage medium storing computer executable code, operable on a moving use equipment (UE) comprising at least one processor; a memory for storing a plurality of codes associated with a resource management protocol, the memory coupled to the at least one processor; a receiver coupled to the at least one processor, wherein the receiver is configured to receive a dynamic characteristic of the moving UE; and the computer executable code includes instructions for causing the at least one processor to adjust the barred time associated with the moving UE based on the dynamic characteristic to yield an adjusted barred time; instructions for causing the at least one processor to apply the adjusted barred time to the resource management protocol; and instructions for causing the at least one processor to execute the resource management protocol in a first wireless network in accordance with the adjusted barred time to access a first cell in the first wireless network.

These and other aspects of the present disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. It will be apparent to those skilled in the art that these concepts may be practiced without these specific details. In some instances, well known structures and components are shown in block diagram form in order to avoid obscuring such concepts.

Figure 1:
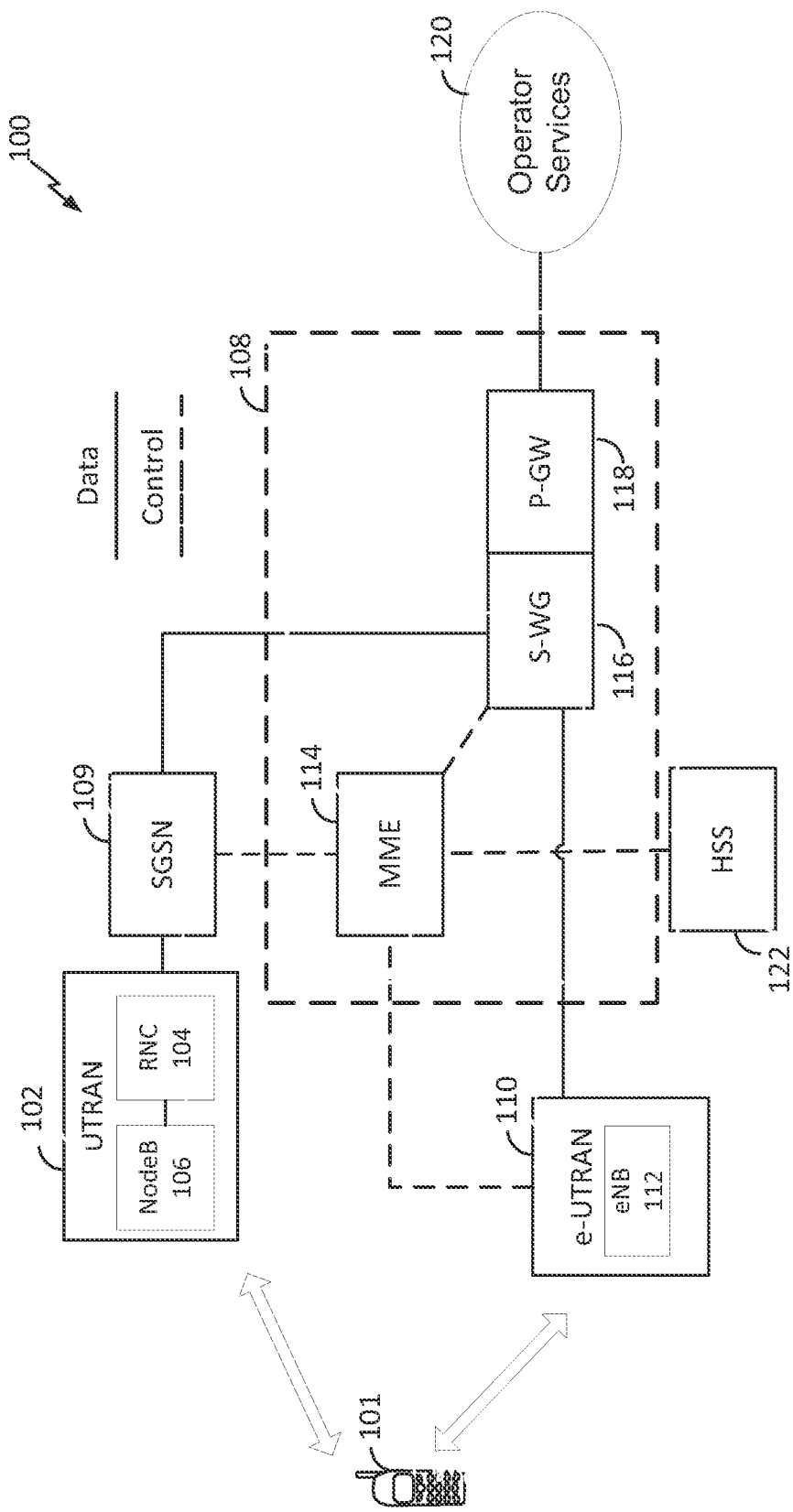
FIG. 1 is a block diagram conceptually illustrating an example of a telecommunications system.

FIG. 1 is a block diagram conceptually illustrating a telecommunications system 100 including a UTRAN and an eUTRAN according to an example of the disclosure. Referring now to FIG. 1, the telecommunications system 100 may include UMTS/HSPA and long term evolution (LTE) network access to a user equipment (UE) 101. In various examples, the telecommunications system 100 has an evolved packet core (EPC), a UTRAN 102, and an eUTRAN 110. Among several options available for the UTRAN 102, in this example, the illustrated UTRAN 102 may employ a WCDMA air interface for enabling various wireless services including telephony, video, data, messaging, broadcasts, and/or other services. The UTRAN 102 may include a plurality of Radio Network Subsystems (RNSs), each controlled by a respective Radio Network Controller (RNC) such as an RNC 104. For reasons of clarity, only the RNC 104 is shown in FIG. 1. The RNC 104 is an apparatus responsible for, among other things, assigning, reconfiguring, and releasing radio resources within an RNS. The RNC 104 may be interconnected to other RNCs (not shown) in the UTRAN 102 through various types of interfaces such as a direct physical connection, a virtual network, or the like using any suitable transport network.

The geographic region covered by the RNS may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, one Node B 106 is shown in the UTRAN 102; however, each RNS may include any number of wireless Node Bs. The Node B 106 provides wireless access points to a core network for any number of mobile apparatuses (e.g., UE 101). Examples of a mobile apparatus include a cellular phone, a smart phone, a session initiation protocol (SIP) phone, a laptop, a notebook, a netbook, a smartbook, a personal digital assistant (PDA), a satellite radio, a Global Positioning System (GPS) device, a multimedia device, a video device, a digital audio player (e.g., MP3 player), a camera, a game console, or any other similar functioning device. The mobile apparatus is commonly referred to as user equipment (UE) in UMTS and LTE applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. The UE 101 may further include a universal subscriber identity module (USIM) (not shown), which contains a user's subscription information to a network. For illustrative purposes, one UE 101 is shown in communication with the Node B 106. The downlink (DL), also called the forward link, refers to the communication link from the Node B 106 to the UE 101, and the uplink (UL), also called the reverse link, refers to the communication link from the UE 101 to the Node B 106.

The telecommunications system 100 may include a serving GPRS support node (SGSN) 109 to provide packet-data services. The SGSN 109 provides a packet-based connection for the UTRAN 102 to the EPC 108.

As shown, an evolved packet core (EPC) 108 can interface with one or more radio access networks, such as the UTRAN 102 and an evolved UTRAN (eUTRAN) 110. As those skilled in the art will recognize, the various concepts presented throughout this disclosure may be implemented in other suitable radio access networks, to provide UEs with access to types of core networks other than UMTS and LTE networks. The eUTRAN 110 may include an eNode B (eNB) 112 and other eNBs (not shown). The eNB 112 provides user and control plane protocol terminations toward the UE 101. The eNB 112 may be connected to the other eNBs via an X2 interface (i.e., backhaul). The eNB 112 may also be referred to by those skilled in the art as a base station, a base transceiver station, a radio base station, a radio transceiver, a transceiver function, a basic service set (BSS), an extended service set (ESS), or some other suitable terminology. The eNB 112 provides an access point to the EPC 108 for the UE 101.

The EPC 108 includes a Mobility Management Entity (MME) 114, other MMEs (not shown), a Serving Gateway (S-GW) 116, and a Packet Data Network (PDN) Gateway (P-GW) 118. The MME 114 is the control node that processes the signaling between the UE 101 and the EPC 108. Generally, the MME 114 provides bearer and connection management. User IP packets are transferred through the S-GW 116, which itself is connected to the P-GW 118. The P-GW 118 provides UE IP address allocation as well as other functions. The P-GW 118 is connected to Operator's IP Services 120. The Operator's IP Services may be provided by one or more remote servers. The terms Operator's IP Services and remote server(s) may be used interchangeably herein. The Operator's IP Services 120 may include the Internet, the Intranet, an IP Multimedia Subsystem (IMS), and a PS Streaming Service (PSS). One example, the Operator's IP Services 120 include a TCP server. The telecommunications network 100 may include a Home Subscriber Server (HSS) 122 that presents the registers, covering functionalities such as the Home Location Register (HLR) and contains, for example, user-specific information on service priorities, data rates, etc. The S-GW 116 and P-GW 118 handle tasks related to the mobility management inside the eUTRAN 110, as well as the UTRAN 102. As shown in FIG. 1, the SGSN 109 is operatively connected to the gateways 116 and 118, thus handling the Gateway GPRS Support Node (GGSN) functionalities of the UTRAN network.

Figure 2:
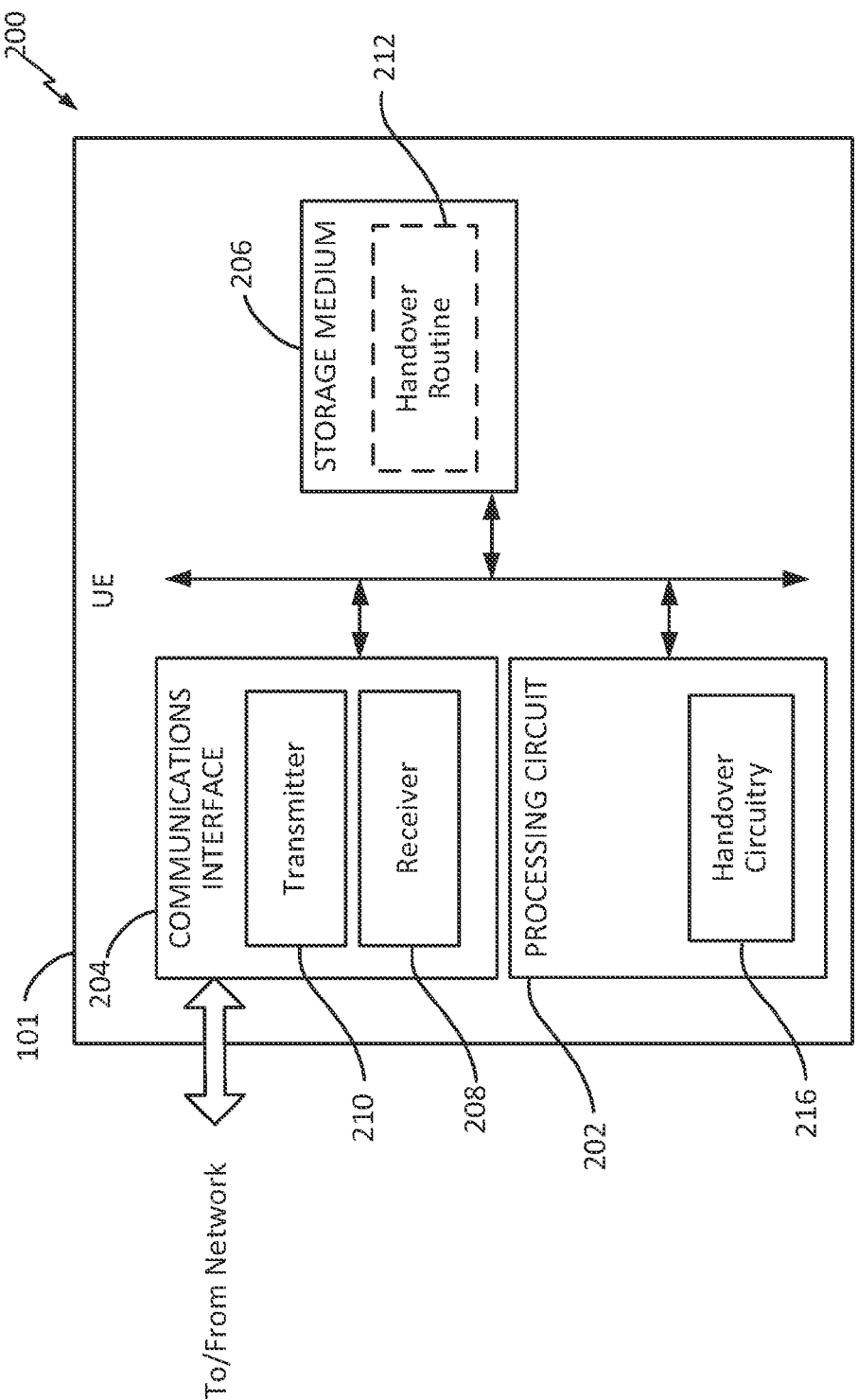
FIG. 2 is a conceptual diagram illustrating an example of a hardware implementation for a user equipment (UE) employing a processing system.

FIG. 2 is a conceptual diagram illustrating a hardware implementation for the UE 101 according to an example of the disclosure. Components of the UE 101 generally known in the art are not shown for reasons of clarity and comprehensibility. As shown in FIG. 2, the UE 101 generally includes a processing circuit 202 coupled to or placed in electrical communication with a communications interface 204 and a storage medium 206.

The processing circuit 202 is arranged to obtain, process and/or send data, control data access and storage, issue commands, and control other desired operations. The processing circuit 202 may include circuitry adapted to implement desired programming provided by appropriate media in at least one example. For example, the processing circuit 202 may be implemented as one or more processors, one or more controllers, and/or other structures configured to execute executable programming Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 206. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 204 is configured to facilitate wireless communications of the UE 101. For example, the communications interface 204 may include circuitry and/or programming adapted to facilitate the communication of information bi-directionally with respect to one or more network nodes. The communications interface 204 may be coupled to one or more antennas (not shown), and includes wireless transceiver circuitry, including at least one receiver circuit 208 (e.g., one or more receiver chains) and/or at least one transmitter circuit 210 (e.g., one or more transmitter chains).

The storage medium 206 may represent one or more computer-readable, machine-readable, and/or processor-readable devices for storing programming, such as processor executable code or instructions (e.g., software, firmware), electronic data, databases, or other digital information. The storage medium 206 may also be used for storing data that is manipulated by the processing circuit 202 when executing programming. The storage medium 206 may be any available media that can be accessed by a general purpose or special purpose processor, including portable or fixed storage devices, optical storage devices, and various other mediums capable of storing, containing and/or carrying programming By way of example and not limitation, the storage medium 206 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 206 may be coupled to the processing circuit 202 such that the processing circuit 202 can read information from, and write information to, the storage medium 206. That is, the storage medium 206 can be coupled to the processing circuit 202 so that the storage medium 206 is at least accessible by the processing circuit 202, including examples where the storage medium 206 is integral to the processing circuit 202 and/or examples where the storage medium 206 is separate from the processing circuit 202 (e.g., resident in the UE 101, external to the UE 101, and/or distributed across multiple entities).

Programming stored by the storage medium 206, when executed by the processing circuit 202, causes the processing circuit 202 to perform one or more of the various functions and/or process steps described herein. For example, the storage medium 206 may include a handover routine 212 that may be executed by the processing circuit 202 (e.g., a handover circuitry 216) to handle Inter-RAT handovers. Thus, according to one or more aspects of the present disclosure, the processing circuit 202 is adapted to perform (in conjunction with the storage medium 206) any or all of the processes, functions, steps and/or routines for any or all of the UEs described herein (e.g., UE 101). As used herein, the term "adapted" in relation to the processing circuit 202 may refer to the processing circuit 202 being one or more of configured, employed, implemented, and/or programmed to perform a particular process, function, step and/or routine according to various features described herein.

Figure 3:
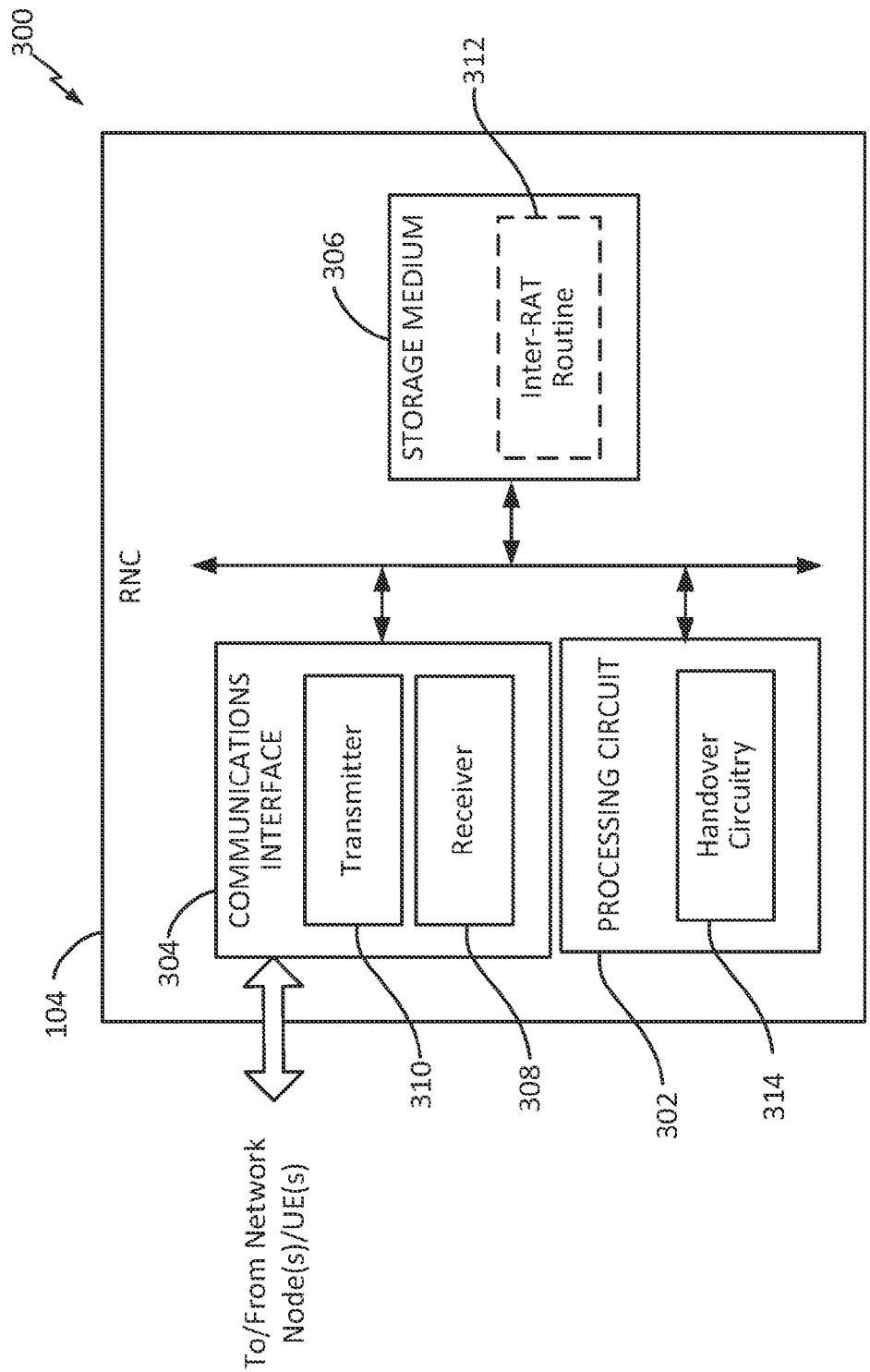
FIG. 3 is a conceptual diagram illustrating an example of a hardware implementation for a Radio Network Controller (RNC) employing a processing system.

FIG. 3 is a conceptual diagram illustrating a hardware implementation of the Radio Network Controller (RNC) 104 according to an example of the disclosure. Components of the RNC 104 generally known in the art are not shown for reasons of clarity and comprehensibility. As shown, the RNC 104 includes a processing circuit 302 coupled to or placed in electrical communication with a communications interface 304 and to a storage medium 306. The processing circuit 302 is arranged to obtain, process and/or send data, control data access and storage, issue commands, and control other desired operations. The processing circuit 302 may include circuitry adapted for processing, including the execution and implementation of programming provided by appropriate media, including media stored on the storage medium 306 in at least one example. Examples and implementations for the processing circuit 302 may include any of the various examples and implementations of the processing circuit 202 described above with reference to FIG. 2. The examples of the processing circuit 302 including those set forth with reference to the processing circuit 202 in FIG. 2 are for illustration, and other suitable configurations within the scope of the present disclosure are also contemplated.

The communications interface 304 is configured to facilitate wired and/or wireless communications of the RNC 104. For example, the communications interface 304 may include circuitry and/or programming adapted to facilitate the communication of information bi-directionally with respect to one or more UEs, as well as one or more other network nodes. The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains).

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming. Examples of the storage medium 306 may include any of the examples included in the description of the storage medium 206 set forth above with reference to FIG. 2.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the RNC 104, external to the RNC 104, and/or distributed across multiple entities).

Programming stored by the storage medium 306, when executed by the processing circuit 302, causes the processing circuit 302 to perform one or more of the various functions and/or process steps described herein. For example, the storage medium 306 may include an Inter-RAT routine 312, and the processing circuit 302 may include a handover circuitry 314 that is adapted to perform various functions in accordance with the Inter-RAT routine 312. The various functions of the Inter-RAT routine 312 will be described in more detail infra. Thus, according to one or more aspects of the present disclosure, the processing circuit 302 is adapted to perform (in conjunction with the storage medium 306) any or all of the processes, functions, steps and/or routines for any or all of the RNC 104 described herein. As used herein, the term "adapted" in relation to the processing circuit 302 may refer to the processing circuit 302 being one or more of configured, employed, implemented, and/or programmed to perform a particular process, function, step and/or routine according to various features described herein.

Figure 4:
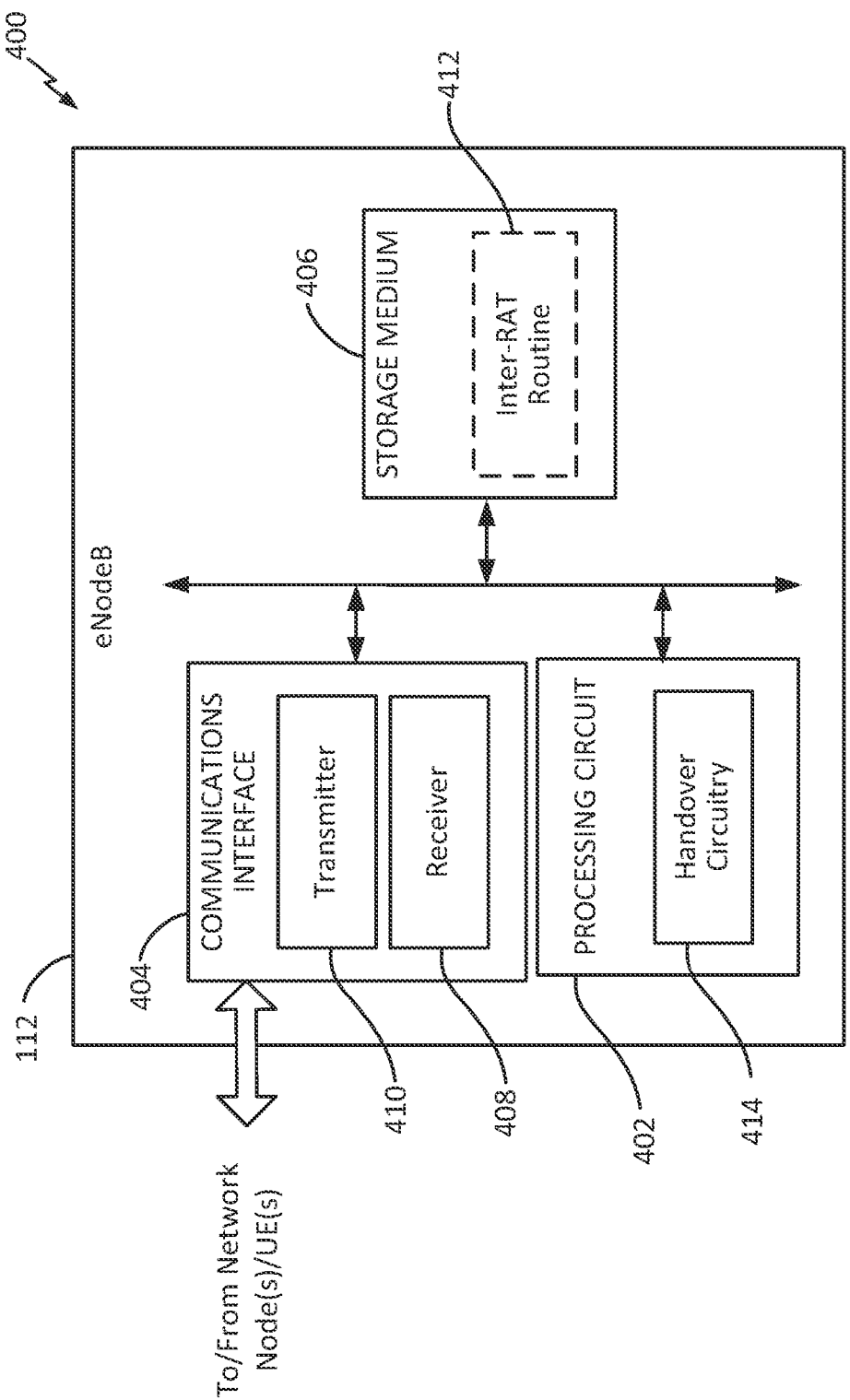
FIG. 4 is a conceptual diagram illustrating an example of a hardware implementation for an eNode B (eNB) employing a processing system.

FIG. 4 is a conceptual diagram illustrating a hardware implementation of the eNB 112 according to an example of the disclosure. Components of the eNB 112 generally known in the art are not shown for reasons of clarity and comprehensibility. As shown, the eNB 112 includes a processing circuit 402 coupled to or placed in electrical communication with a communications interface 404 and to a storage medium 406. The processing circuit 402 is arranged to obtain, process and/or send data, control data access and storage, issue commands, and control other desired operations. The processing circuit 402 may include circuitry adapted for processing, including the execution and implementation of programming provided by appropriate media, including media stored on the storage medium 406 in at least one example. Examples and implementations for the processing circuit 402 may include any of the various examples and implementations of the processing circuit 202 described above with reference to FIG. 2. The examples of the processing circuit 402 including those set forth with reference to the processing circuit 202 in FIG. 2 are for illustration, and other suitable configurations within the scope of the present disclosure are also contemplated.

The communications interface 404 is configured to facilitate wired and/or wireless communications of the eNB 112. For example, the communications interface 404 may include circuitry and/or programming adapted to facilitate the communication of information bi-directionally with respect to one or more UEs, as well as one or more other network nodes. The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more computer-readable, machine-readable, and/or processor-readable devices for storing programming, such as processor executable code or instructions (e.g., software, firmware), electronic data, databases, or other digital information. The storage medium 406 may also be used for storing data that is manipulated by the processing circuit 402 when executing programming. The storage medium 406 may be any available media that can be accessed by a general purpose or special purpose processor, including portable or fixed storage devices, optical storage devices, and various other mediums capable of storing, containing and/or carrying programming. Examples of the storage medium 406 may include any of the examples included in the description of the storage medium 206 set forth above with reference to FIG. 2.

The storage medium 406 may be coupled to the processing circuit 402 such that the processing circuit 402 can read information from, and write information to, the storage medium 406. That is, the storage medium 406 can be coupled to the processing circuit 402 so that the storage medium 406 is at least accessible by the processing circuit 402, including examples where the storage medium 406 is integral to the processing circuit 402 and/or examples where the storage medium 406 is separate from the processing circuit 402 (e.g., resident in the eNB 112, external to the eNB 112, and/or distributed across multiple entities).

Programming stored by the storage medium 406, when executed by the processing circuit 402, causes the processing circuit 402 to perform one or more of the various functions and/or process steps described herein. For example, the storage medium 406 may include an Inter-RAT routine 412, and the processing circuit 402 may include a handover circuitry 414 that is adapted to perform various functions in accordance with the Inter-RAT routine 412. The various functions of the Inter-RAT routine 412 will be described in more detail infra. Thus, according to one or more aspects of the present disclosure, the processing circuit 402 is adapted to perform (in conjunction with the storage medium 406) any or all of the processes, functions, steps and/or routines for any or all of the eNB 112 described herein. As used herein, the term "adapted" in relation to the processing circuit 402 may refer to the processing circuit 402 being one or more of configured, employed, implemented, and/or programmed to perform a particular process, function, step and/or routine according to various features described herein.

Figure 5:
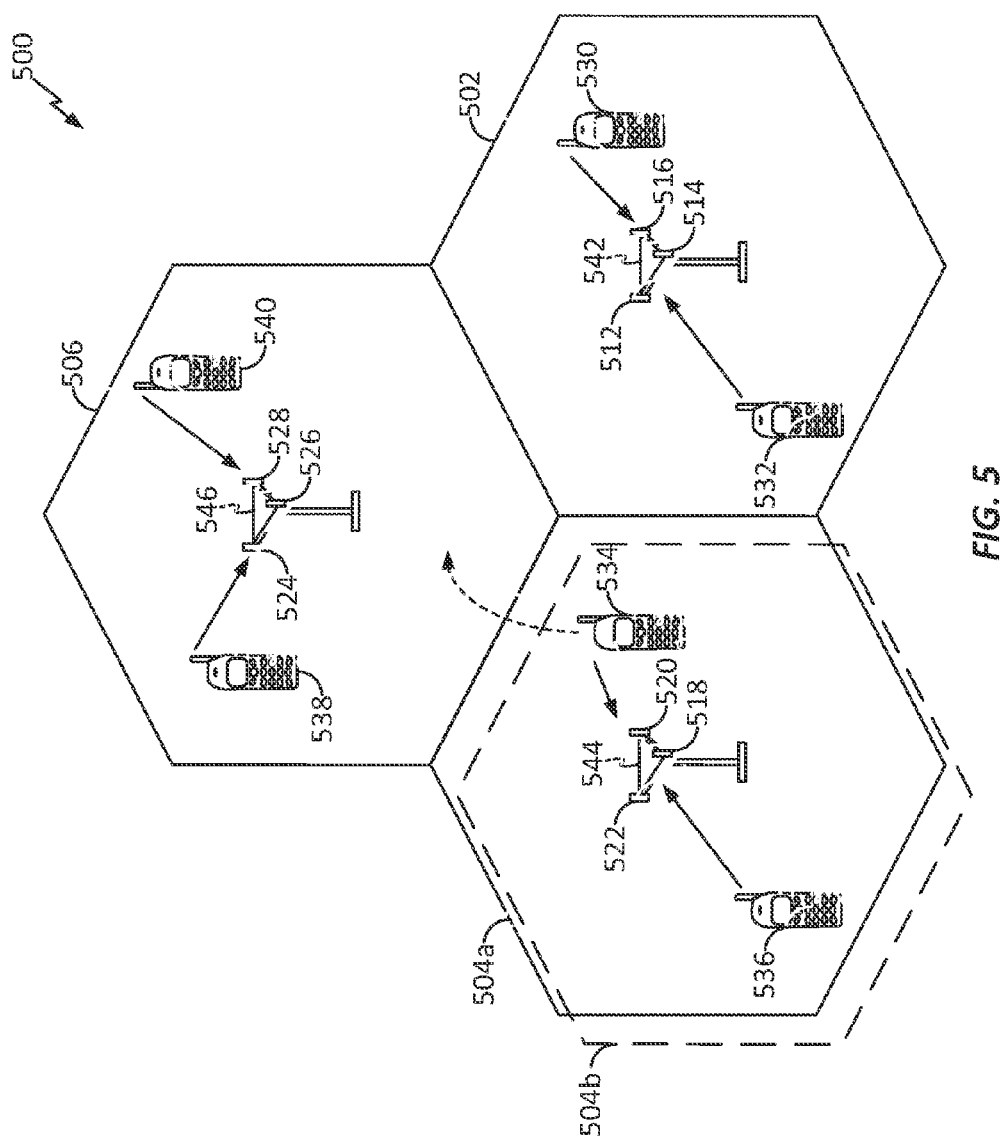
FIG. 5 is a diagram conceptually illustrating an example of a radio access network (RAN).

FIG. 5 is a diagram conceptually illustrating an example of a radio access network (RAN) 500 supporting multiple RATs (e.g., UTRAN and eUTRAN) that may be utilized in accordance with the present disclosure. The RAN 500 includes multiple cellular regions (cells), including cells 502, 504, and 506, each of which may include one or more sectors. Cells may be defined geographically (e.g., by coverage area) and/or may be defined in accordance with a frequency, scrambling code, etc. That is, the illustrated geographically-defined cells 502, 504, and 506 may each be further divided into a plurality of cells In a cell that is divided into sectors, the multiple sectors within a cell can be formed by groups of antennas with each antenna responsible for communication with UEs in a portion of the cell. For example, in cell 502, antenna groups 512, 514, and 516 may each correspond to a different sector. In cell 504, antenna groups 518, 520, and 522 may each correspond to a different sector. In cell 506, antenna groups 524, 526, and 528 may each correspond to a different sector.

The cells 502, 504, and 506 may include several UEs that may be in communication with one or more sectors of each cell 502, 504, or 506. For example, UEs 530 and 532 may be in communication with Node B/eNB 542, UEs 534 and 536 may be in communication with Node B/eNB 544, and UEs 538 and 540 may be in communication with Node B/eNB 546. Here, each Node B/eNB 542, 544, and 546 may be configured to provide an access point to a EPC 108 (see FIG. 1) for the UEs 530, 532, 534, 536, 538, and 540 in the respective cells 502, 504, and 506. In various examples, each of the Node B/eNB 542, 544, and 546 may include a Node B 106, an eNB 112, or both. In some examples, a Node B and an eNB of the same cell may be at the same location or different locations. That is, a coverage area of a Node B (e.g., 504a) and that of a corresponding eNB (e.g., 504b) may overlap each other, partially overlap each other, or do not overlap. Therefore, the RAN 500 may support multiple radio access networks such as the HSPA and LTE standards.

Recently, many existing networks have been upgraded to support UMTS and LTE. Therefore, a UE 101 configured to support multiple RATs may move from one RAT to another RAT (Inter-RAT handover) in the middle of an ongoing communication. In certain scenarios, e.g., in a high speed train, the UE 101 may experience a high speed relative to the RAT and there is a desire to maintain access to a dedicated wireless network.

In a wireless telecommunications system, the communication protocol architecture may take on various forms depending on the particular application. For example, in a 3GPP UMTS network, the signaling protocol stack is divided into a Non-Access Stratum (NAS) and an Access Stratum (AS). The NAS provides the upper layers, for signaling between the UE 101 and the core network, and may include circuit switched and packet switched protocols. The AS provides the lower layers, for signaling between the UTRAN/eUTRAN and the UE 101, and may include a user plane and a control plane. Here, the user plane (also referred to herein as the data plane) carries user traffic, while the control plane carries control information (i.e., signaling).

Figure 6:
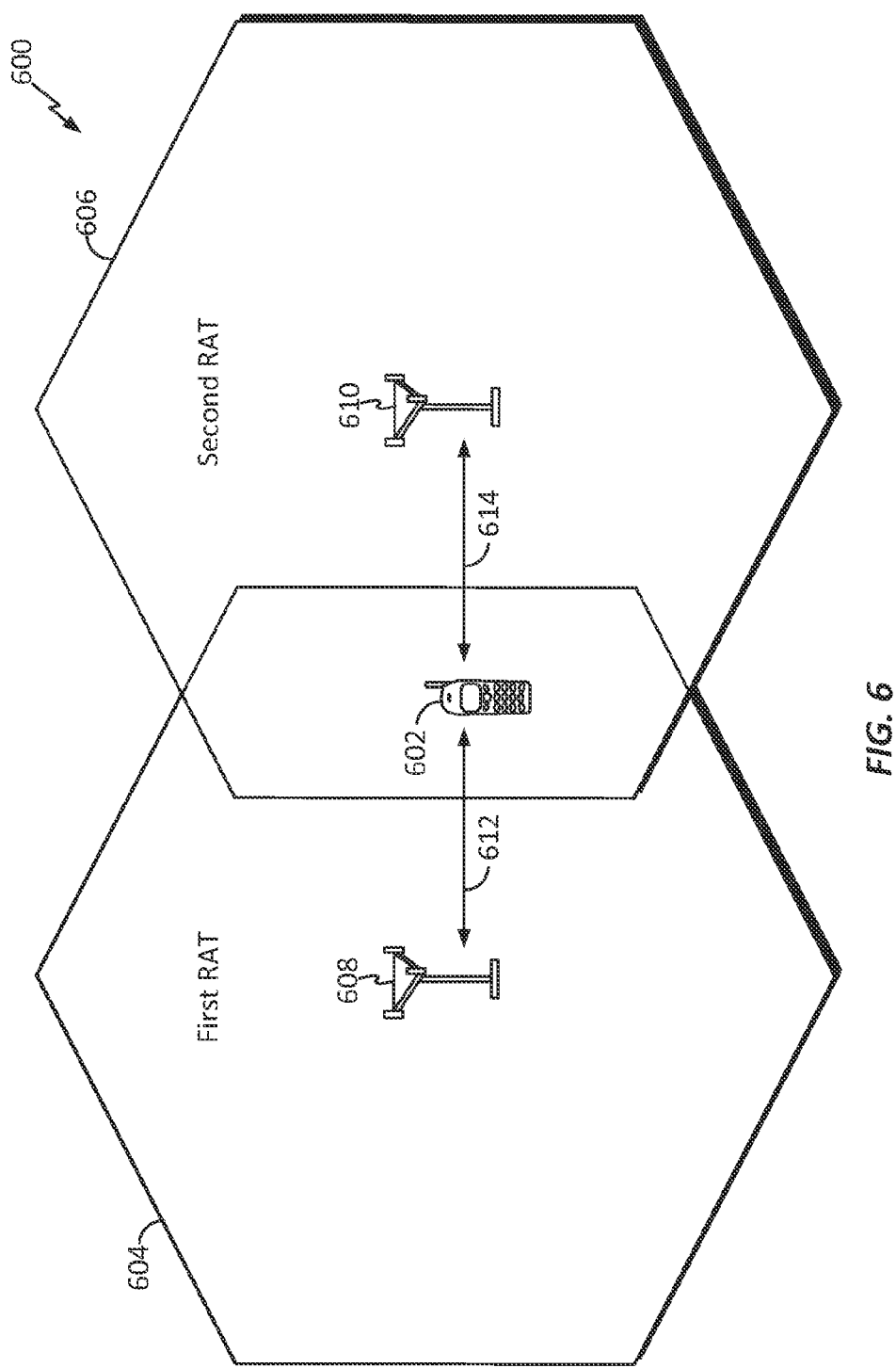
FIG. 6 is a diagram illustrating a multimode user equipment (UE) located in an area serviced by two or more RATs in accordance with aspects of the disclosure.

FIG. 6 is a diagram illustrating a multimode UE 602 located in an area serviced by two or more RATs such as a first RAT 604 (first cell) and a second RAT 606 (second cell) in accordance with aspects of the disclosure. In one non-limiting example, the first RAT 604 may be W-CDMA, and the second RAT 606 may be LTE. The first RAT 604 is associated with a first base station 608, and the second RAT 606 is associated with a second base station 610. In some examples, the first base station and second base station may be the same base station. In other examples, the UE 602 may be located in an area serviced by multiple second RATs (e.g., GSM, W-CDMA, LTE, etc.). However, only one second RAT 606 is shown in FIG. 6 for clarity. The coverage areas of the first RAT 604 and second RAT 606 may be partially overlapped or completely overlapped.

Figure 7:
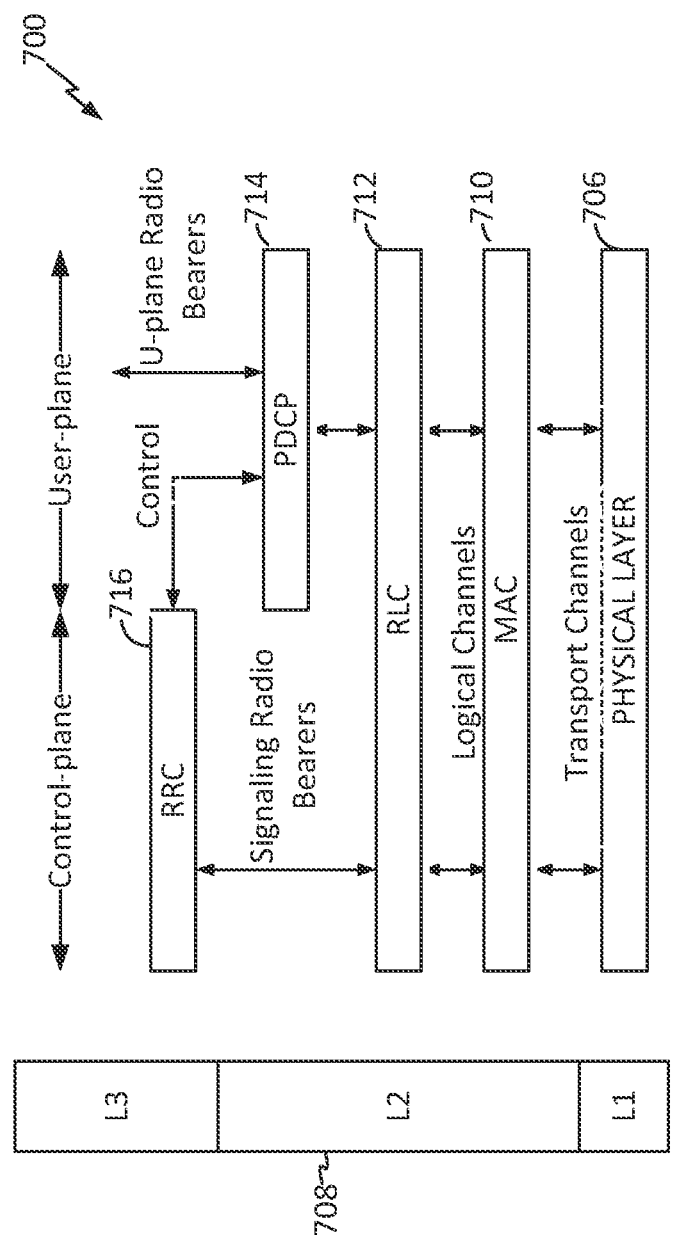
FIG. 7 is a diagram illustrating an example of a third generation (3G) radio protocol architecture.

FIG. 7 is a diagram illustrating an example of a radio protocol architecture operational in a UMTS network. Turning to FIG. 7, the AS is shown with three layers: Layer 1, Layer 2, and Layer 3. Layer 1 is the lowest layer and implements various physical layer signal processing functions. Layer 1 will be referred to herein as the physical layer 706. The data link layer, called Layer 2 708, is above the physical layer 706 and is responsible for the link between the UE 101 and Node B 106 over the physical layer 706.

At Layer 3, the RRC layer 716 handles the control plane signaling between the UE 101 and the Node B 106. RRC layer 716 includes a number of functional entities for routing higher layer messages, handling broadcasting and paging functions, establishing and configuring radio bearers, etc.

In the illustrated air interface, the L2 layer 708 is split into sublayers. In the control plane, the L2 layer 708 includes two sublayers: a medium access control (MAC) sublayer 710 and a radio link control (RLC) sublayer 712. In the user plane, the L2 layer 708 additionally includes a packet data convergence protocol (PDCP) sublayer 714. Although not shown, the UE 101 may have several upper layers above the L2 layer 708 including a network layer (e.g., IP layer) that is terminated at a PDN gateway on the network side and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between Node Bs.

The RLC sublayer 712 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
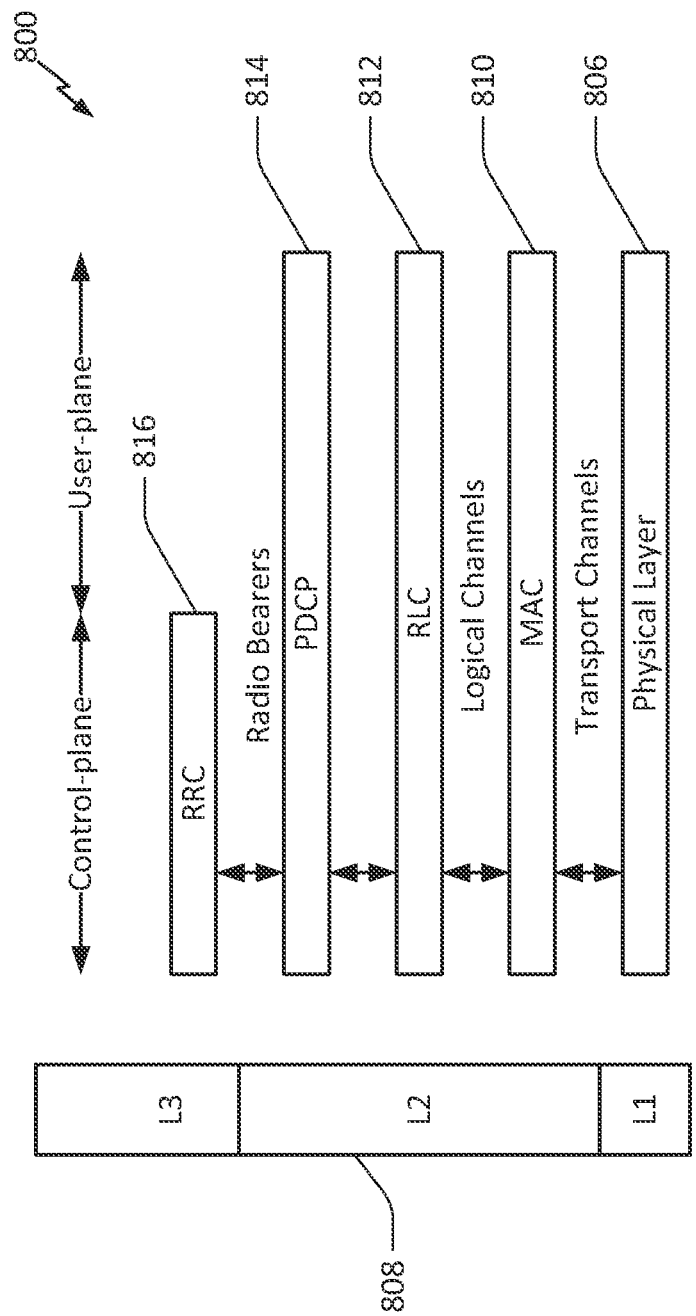
FIG. 8 is a diagram illustrating an example of a fourth generation (4G) radio protocol architecture.

FIG. 8 is a diagram illustrating an example of a radio protocol architecture operable in an LTE network. Turning to FIG. 8, the radio protocol architecture for communication between the UE 101 and the eNB 112 is shown with three layers: Layer 1, Layer 2, and Layer 3. Layer 1 is the lowest layer and implements various physical layer signal processing functions. Layer 1 will be referred to herein as the physical layer 806. Layer 2 (L2 layer) 808 is above the physical layer 806 and is responsible for the link between the UE 101 and eNB 112 over the physical layer 806. In the user plane, the L2 layer 808 includes a media access control (MAC) sublayer 810, a radio link control (RLC) sublayer 812, and a packet data convergence protocol (PDCP) sublayer 814, which are terminated at the eNB 112 on the network side. Although not shown, the UE 101 may have several upper layers above the L2 layer 808 including a network layer (e.g., IP layer) that is terminated at the P-GW 118 (see FIG. 1) on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between eNBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE 101 and eNB 112 is substantially the same for the physical layer 806 and the L2 layer 808 with the exception that there is no header compression function for the control plane. The control plane also includes a radio resource control (RRC) sublayer 816 in Layer 3. The RRC sublayer 816 is responsible for obtaining radio resources (i.e., radio bearers) and for configuring the lower layers using RRC signaling between the eNB and the UE.

Hereinafter, various aspects of the disclosure are described in the following nonlimiting examples in which the UE 101 may include hardware and/or software for supporting multiple RATs. By way of example, and not limited thereto, the UE 101 may include hardware and/or software for supporting HSPA and LTE standards. When the UE 101 moves at a high speed, it may experience an access failure to a dedicated wireless network. Therefore, according to aspects of the present disclosure, UE based and network based techniques are used to adjust the barred time to improve the probability of access to the dedicated wireless network.

In a wireless network handover process from one wireless network to another, access barring is a procedure which may influence the transition from one wireless network to another. In some scenarios, it may be desirable to not transition from one wireless network to a different wireless network; that is, it may be desirable to remain on the same wireless network. A technique to minimize the probability of wireless network handover in this scenario is a modification of access barring procedures.

In wireless communication systems (e.g., a Long Term Evolution (LTE) network, a Universal Mobile Telecommunications System (UMTS) network, a Code Division Multiple Access (CDMA) network, or one of a second generation (2G), third generation (3G), fourth generation (4G) or fifth generation (5G) network, etc.), a resource management protocol (e.g., Radio Resource Control (RRC) protocol) may specify user equipment (UE) behavior in a scenario with undesirable wireless conditions. In particular, the Radio Resource Control (RRC) protocol states that if the user equipment (UE) experiences an undesirable wireless condition, for example, while attempting connection establishment from a first cell in a dedicated wireless network, then it considers the first cell as barred per TS 36.304. In various aspects, undesirable wireless conditions may include one or more of the following: acquisition failure of a system information message (e.g., a Master Information Block (MIB) or a System Information Block (SIB)), an access failure, a downlink reception decoding error, an uplink transmission error, a reception error, a random access channel (RACH) error, poor quality of service (QoS), etc.

Access barring is a traffic load control procedure to restrict access during high traffic demand periods. Barred time is the time duration in which the UE is prevented from attempting to access the first cell once the UE has experienced an undesirable wireless condition. The barred time may be based on a parameter specified in the SIB2, or the barred time may be UE defined.

In various examples, the mobile user speed may cause problems in network access such that the UE experiences an undesirable wireless condition. In this situation, the UE may then be barred from that first cell for a period of time (barred time). In particular, access to the first cell in the dedicated wireless network may be denied. Consequently, the UE may then access a neighboring wireless network (which is not the dedicated wireless network) which may overload the neighboring wireless network.

The resource management protocol may specify, for example, that if the UE experiences undesirable wireless conditions while attempting connection establishment from a first cell in a dedicated wireless network, then the first cell may be considered as barred (e.g., per TS 36.304 of the 3GPP Technical Specification). In this case, for example, the UE may then attempt connection establishment from another cell in an alternative wireless network (i.e. different from the dedicated wireless network).

For example, access barring is a traffic load control procedure to restrict UE access to a cell during high traffic demand periods. Barred time is a time duration parameter in which the UE is prevented from attempting to access a cell when the UE experiences an undesirable wireless condition. For example, the barred time may be based on a parameter specified in a System Information Block (SIB), or the barred time may be defined by the UE. As an example, the barred time may have a value ranging from 0 sec to 300 sec with an example typical value of 10 sec. One skilled in the art would understand that the value of the barred time may be set to any number, for example, per user choice, application default setting, etc.

In various examples, in a scenario where a high speed vehicle, such as a high speed train, carries at least one UE, the high speed vehicle may cause wireless network access difficulties to a first cell. For example, the UE experiences an undesirable wireless condition which may include one or more of the following: acquisition failure of a system information message (e.g., Master Information Block (MIB) or System Information Block (SIB)), an access failure, a downlink reception decoding error, an uplink transmission error, a reception error, a random access channel (RACH) error, poor quality of service (QoS), etc.

In this case, the UE may be barred from the first cell for a period of time, e.g., barred time, per a resource management protocol. The barring from the first cell in a dedicated wireless network may cause the UE to access an alternative wireless network within its coverage (i.e., spatial and/or frequency coverage). For example, the alternative wireless network is not part of the dedicated wireless network (i.e., the alternative wireless network is a non-dedicated wireless network). Having the UE access the alternative wireless network may result in an overload in the alternative wireless network by mobile users on the high speed vehicle (e.g. high speed train). For example, the dedicated wireless network may be an initial network for the UE to receive the MIB or SIB.

Figure 9:
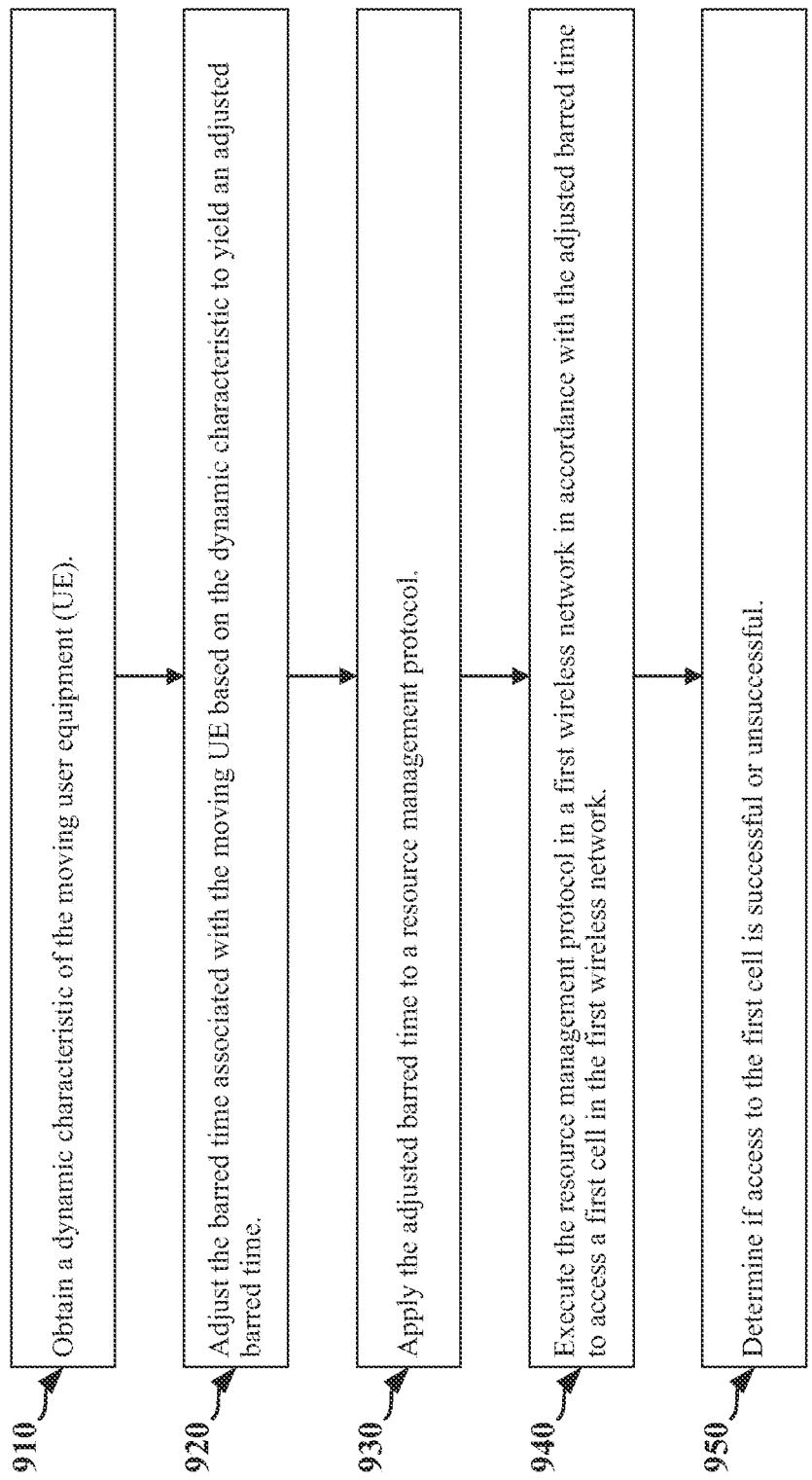
FIG. 9 is a flow chart illustrating an example of adjusting a barred time associated with a moving user equipment (UE).

FIG. 9 is a flow chart illustrating an example of adjusting a barred time associated with a moving user equipment (UE). In the example flow diagram of FIG. 9, the moving UE is configured to attempt access of a first cell. The first cell is part of a first wireless network, wherein the first wireless network may be a dedicated wireless network for the moving UE.

In block 910, obtain a dynamic characteristic of the moving user equipment (UE). In various aspects, a receiver is used to obtain the dynamic characteristic. The receiver may be a component of the moving UE, for example, the receiver may be receiver 208 shown in FIG. 2. Other examples of hardware implementations for obtaining the dynamic characteristic may include a receiver coupled with a receiving antenna (not shown).

In various examples, the dynamic characteristic may be a UE speed, a rate of change of a received signal strength indication (RSSI) and/or a quality indication measured by the moving UE, or a determination that a second cell for attempting access by the moving UE is part of the dedicated wireless network. The UE speed may be obtained from a Global Positioning System (GPS) measurement, a Doppler frequency (e.g., by a frequency tracking loop with different filter types, such as first order, second order, exponential, etc.), or a quantity count of cell reselections within a predetermined time period (e.g., by counting how many cells switch over in a predetermined time period). Quality indication may include one or more of bit error rate (BER), chip error rate (CER), cyclic redundancy check (CRC) error count, etc. One skilled in the art would understand that the predetermined time period may be selected by a user or may be based on the wireless network, etc. In various examples, the GPS measurement is obtained from a GPS receiver, and the Doppler frequency is obtained from a frequency tracking loop which may be a component within the receiver 208 or the processing circuit 202. In various examples, the quantity count of cell reselections may be obtained using a counter, for example, a counter within the processing circuit 202. One skilled in the art would understand that other hardware (not mentioned herein) may be used to obtain the GPS measurement, the Doppler frequency and/or the quantity count of cell reselections and be within the scope and spirit of the present disclosure.

In block 920, adjust the barred time associated with the moving UE based on the dynamic characteristic to yield an adjusted barred time. In various examples, the processing circuit 202 is used to adjust the barred time. In various examples, the barred time is adjusted as a function of the UE speed such that the adjusted barred time and the UE speed have one of the following functional relationships: inversely proportional, inversely logarithmic, inversely quadratic or another mathematical function. In various examples, the adjusted barred time is zero seconds. That is, there is no barring and the moving UE may perform acquisition on other cells within its coverage (i.e., spatial and/or frequency coverage), even though the moving UE may have experienced an undesirable wireless condition associated with these other cells. In various examples, the barred time may be adjusted according to other dynamic characteristics of the moving UE, such as but not limited to one or more of the following: a rate of change of received signal strength indication (RSSI) received by the moving UE, or a determination that a second cell for attempting access by the moving UE is part of the dedicated wireless network. The undesirable wireless condition may include one or more of the following: acquisition failure of a system information message (e.g., a Master Information Block (MIB) or a System Information Block (SIB)), an access failure, a downlink reception decoding error, an uplink transmission error, a reception error, a random access channel (RACH) error, poor quality of service (QoS), etc.

In block 930, apply the adjusted barred time to a resource management protocol. In various examples, the processing circuit 202 is used to apply the adjusted barred time to the resource management protocol. In various examples, codes associated with the resource management protocol are stored within a storage medium, for example, storage medium 206 shown in FIG. 2. In various examples, the resource management protocol is a radio resource control (RRC) protocol. The resource management protocol may be a procedure by which the moving UE gains access to a wireless network. For example, access to a wireless network may be attained by receiving a broadcast signal from a base station and replying with an acknowledgment message as part of the resource management protocol. In various examples, the resource management protocol allows the reception of a system information message. The system information message may be a Master Information Block (MIB) or a System Information Block (SIB). The MIB may contain data used for initial access. The SIB may include other system parameter data. The system information message may be carried on a broadcast signal from a base station in the first wireless network.

In block 940, execute the resource management protocol in a first wireless network in accordance with the adjusted barred time to access a first cell in the first wireless network. For example, the first wireless network may be a dedicated wireless network. The dedicated wireless network may be a Long Term Evolution (LTE) network, a Universal Mobile Telecommunications System (UMTS) network, a Code Division Multiple Access (CDMA) network, or one of a second generation (2G), third generation (3G), fourth generation (4G) or fifth generation (5G) network. In block 950, determine if access to the first cell is successful or unsuccessful. If unsuccessful, the moving UE may delay the moving UE's reacquisition attempts for a period of time specified by the adjusted barred time. In various examples, the processing circuit 202 is used to execute the resource management protocol, for example, using codes for the resource management protocol stored within the storage medium 206.

In various examples, the determination that the access to the first cell is successful or unsuccessful based on detection by the moving UE of one or more of the following undesirable conditions: an undecodable system information message (e.g., an undecodable Master Information Block (MIB) or an undecodable System Information Block (SIB)), a random access failure error, a downlink reception decoding error, an uplink transmission error, a reception error or a below-threshold quality of service (QoS) from the first cell. In various examples, the quantity of the below-threshold quality of service (QoS) is set by a user and/or is set based on the service provided. In various examples, the processing circuit 202 is used to determine that the access to the first cell is successful or unsuccessful.

In various examples, the moving UE's reacquisition attempts may be to the first cell, to a second cell of the first wireless network (which may be part of the dedicated wireless network), or to a third cell, wherein the third cell is not part of the dedicated wireless network. And, the UE receiver (e.g., receiver 208) may be used to perform the reacquisition attempts. In various example, the receiver may be coupled to a receiving antenna (not shown).

Figure 10:
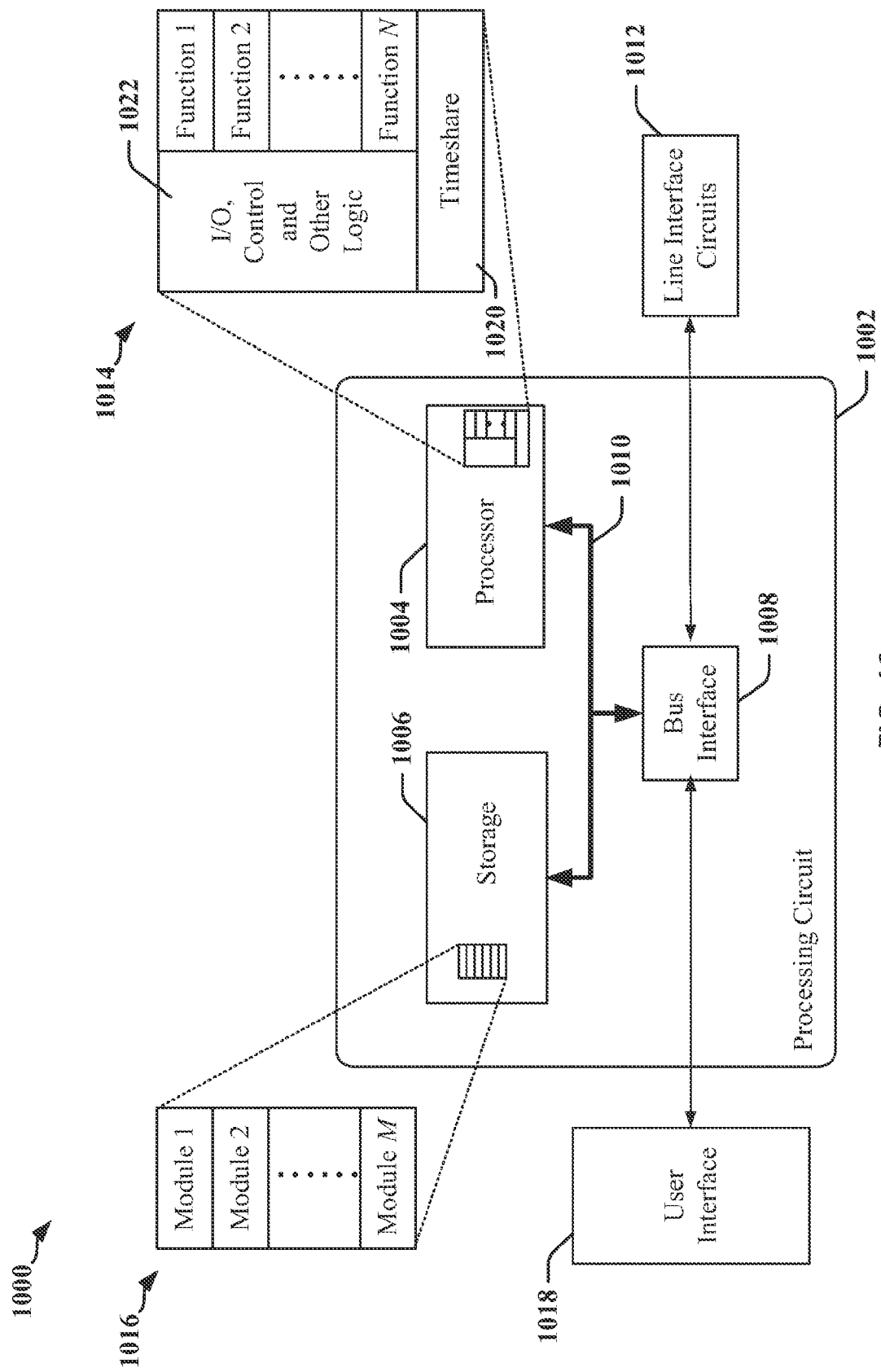
FIG. 10 is a conceptual diagram illustrating a simplified example of a hardware implementation for an apparatus employing a processing circuit that may be configured to perform one or more functions disclosed herein.

Although receiver 208, processing circuit 202 and/or storage medium 206 are listed as example hardware for achieving the steps in the flow diagram of FIG. 9, one skilled in the art would understand that other processing circuits (or processors) and storage (e.g., such as processing circuit 1002, processor 1004 and/or storage 1006 of FIG. 10) may be used and be within the scope and spirit of the present disclosure.

FIG. 10 is a conceptual diagram 1000 illustrating a simplified example of a hardware implementation for an apparatus employing a processing circuit 1002 that may be configured to perform one or more functions disclosed herein. In accordance with various aspects of the disclosure, an element, or any portion of an element, or any combination of elements as disclosed herein may be implemented utilizing the processing circuit 1002. The processing circuit 1002 may include one or more processors 1004 that are controlled by some combination of hardware and software modules. Examples of processors 1004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented utilizing a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Additionally, the components described in FIG. 10 may be implemented to perform some or all the blocks of the flow diagram in FIG. 9. Several aspects of a telecommunications system have been presented. As those skilled in the art will readily appreciate, various aspects described throughout this disclosure may be extended to various types of telecommunication systems, network architectures and communication standards.

Several aspects of a wireless telecommunications system have been presented with reference to a UTRAN/eUTRAN system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, blocks, features and/or functions illustrated in the figures may be rearranged and/or combined into a single component, block, feature or function or embodied in several components, blocks, or functions. Additional elements, components, blocks, and/or functions may also be added without departing from novel features disclosed herein. The apparatus, devices, and/or components illustrated in the various drawings may be configured to perform one or more of the methods, features, or blocks described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for adjusting a barred time associated with a moving user equipment (UE), comprising:
using a receiver to obtain a dynamic characteristic of the moving UE, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network;
adjusting the barred time associated with the moving UE based on the dynamic characteristic to yield an adjusted barred time, wherein the adjusting the barred time uses a function of the UE speed, and wherein the barred time and the UE speed have one of the following functional relationships: inversely proportional, inversely logarithmic, or inversely quadratic;
applying the adjusted barred time to a resource management protocol; and
executing the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB).

2. The method of claim 1, wherein the dedicated wireless network is one of the following: a Long Term Evolution (LTE) network, a Universal Mobile Telecommunications System (UMTS) network, a Code Division Multiple Access (CDMA) network, or one of a second generation (2G), third generation (3G), fourth generation (4G) or fifth generation (5G) network.

3. The method of claim 1, wherein the adjusted barred time is zero seconds.

4. The method of claim 1, wherein the resource management protocol is a radio resource control (RRC) protocol.

5. The method of claim 1, further comprising determining if the access to the first cell is successful or unsuccessful based on whether one or more of the following is detected by the moving UE: an undecodable system information message, a random access failure error, a downlink reception decoding error, an uplink transmission error, a reception error or a below-threshold quality of service (QoS) from the first cell.

6. The method of claim 5, wherein the undecodable system information message is either an undecodable Master Information Block (MIB) or an undecodable System Information Block (SIB).

7. The method of claim 5, further comprising performing a reacquisition attempt to a second cell of the dedicated wireless network or to a third cell, wherein the third cell is not part of the dedicated wireless network.

8. The method of claim 7, wherein the reacquisition attempt is delayed by the adjusted barred time.

9. An apparatus for adjusting a barred time associated with a moving user equipment (UE), comprising:
a receiver to obtain a dynamic characteristic of the moving UE, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network;
a processing circuit coupled to the receiver, wherein the processing circuit is configured to perform the following:
adjust the barred time associated with the moving UE based on the dynamic characteristic to yield an adjusted barred time, wherein the adjust the barred time uses a function of the UE speed, and wherein the barred time and the UE speed have one of the following functional relationships: inversely proportional, inversely logarithmic, or inversely quadratic;
apply the adjusted barred time to a resource management protocol; and
execute the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB); and
a storage medium coupled to the processing circuit, wherein the storage medium stores a plurality of codes for executing the resource management protocol.

10. The apparatus of claim 9, wherein the dedicated wireless network is one of the following: a Long Term Evolution (LTE) network, a Universal Mobile Telecommunications System (UMTS) network, a Code Division Multiple Access (CDMA) network, or one of a second generation (2G), third generation (3G), fourth generation (4G) or fifth generation (5G) network.

11. The apparatus of claim 9, further comprising one or more of the following:
a Global Positioning System (GPS) receiver to obtain the UE speed from the GPS measurement; and
a frequency tracking loop to obtain the UE speed from the Doppler frequency.

12. The apparatus of claim 9, wherein the adjusted barred time is zero seconds.

13. The apparatus of claim 9, wherein the processing circuit is further configured to determine if the access to the first cell is successful or unsuccessful based on whether one or more of the following is detected by the moving UE: an undecodable system information message, a random access failure error, a downlink reception decoding error, an uplink transmission error, a reception error or a below-threshold quality of service (QoS) from the first cell.

14. The apparatus of claim 13, wherein the undecodable system information message is either an undecodable Master Information Block (MIB) or an undecodable System Information Block (SIB).

15. The apparatus of claim 13, wherein the processing circuit is further configured to perform a reacquisition attempt to a second cell of the dedicated wireless network or to a third cell, wherein the third cell is not part of the dedicated wireless network, and wherein the reacquisition attempt is delayed by the adjusted barred time.

16. An apparatus for adjusting a barred time associated with a moving user equipment (UE), comprising:
  means for obtaining a dynamic characteristic of the moving UE, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network;
  means for adjusting the barred time associated with the moving UE based on the dynamic characteristic to yield an adjusted barred time, wherein the means for adjusting uses a function of the UE speed, and wherein the barred time and the UE speed have one of the following functional relationships: inversely proportional, inversely logarithmic, or inversely quadratic;
  means for applying the adjusted barred time to a resource management protocol; and
  means for executing the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB).

17. The apparatus of claim 16, wherein the adjusted barred time is zero seconds.

18. The apparatus of claim 16, further comprising means for determining if the access to the first cell is successful or unsuccessful based on whether one or more of the following is detected by the moving UE: an undecodable system information message, a random access failure error, a downlink reception decoding error, an uplink transmission error, a reception error or a below-threshold quality of service (QoS) from the first cell.

19. The apparatus of claim 18, further comprising means for performing a reacquisition attempt to a second cell of the dedicated wireless network or to a third cell, wherein the third cell is not part of the dedicated wireless network, and wherein the reacquisition attempt is delayed by the adjusted barred time.

20. A non-transitory computer-readable storage medium storing computer executable code, operable on a moving use equipment (UE) comprising at least one processor; a memory to store a plurality of codes associated with a resource management protocol, the memory coupled to the at least one processor; a receiver coupled to the at least one processor, wherein the receiver is configured to receive a dynamic characteristic of the moving UE; and the computer executable code comprising:
  instructions for causing the at least one processor to adjust a barred time associated with the moving UE based on the dynamic characteristic to yield an adjusted barred time, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network, wherein the at least one processor is configured to adjust the barred time using a function of the UE speed, and wherein the barred time and the UE speed have one of the following functional relationships: inversely proportional, inversely logarithmic, or inversely quadratic;
  instructions for causing the at least one processor to apply the adjusted barred time to the resource management protocol; and
  instructions for causing the at least one processor to execute the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB).

21. The non-transitory computer-readable storage medium of claim 20, wherein the computer executable code further comprising:
  instructions for causing the at least one processor to determine if the access to the first cell is successful or unsuccessful based on whether one or more of the following is detected by the moving UE: an undecodable system information message, a random access failure error, a downlink reception decoding error, an uplink transmission error, a reception error or a below-threshold quality of service (QoS) from the first cell; and
  instructions for causing the at least one processor to perform a reacquisition attempt by the moving UE to a second cell of a dedicated wireless network or to a third cell, wherein the third cell is not part of the dedicated wireless network and, wherein the reacquisition attempt is delayed by the adjusted barred time.

22. A method for adjusting a barred time associated with a moving user equipment (UE), comprising:
  using a receiver to obtain a dynamic characteristic of the moving UE, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network;
  adjusting the barred time associated with the moving UE based on the dynamic characteristic to yield an adjusted barred time;
  applying the adjusted barred time to a resource management protocol; and
  executing the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB).

23. An apparatus for adjusting a barred time associated with a moving user equipment (UE), comprising:
  a receiver to obtain a dynamic characteristic of the moving UE, wherein the dynamic characteristic is one of the following: a UE speed obtained from a Global Positioning System (GPS) measurement or a Doppler frequency, a rate of change of a received signal strength indication (RSSI) or a quality indication measured by the moving UE, or a determination that a second cell for attempting access is part of a dedicated wireless network;

a processing circuit coupled to the receiver, wherein the processing circuit is configured to perform the following:

adjust the barred time associated with the moving UE based on the dynamic characteristic to yield an adjusted barred time;

apply the adjusted barred time to a resource management protocol; and execute the resource management protocol in the dedicated wireless network in accordance with the adjusted barred time to access a first cell in the dedicated wireless network, wherein the dedicated wireless network is an initial network for the moving UE to receive a Master Information Block (MIB) or a System Information Block (SIB); and a storage medium coupled to the processing circuit, wherein the storage medium stores a plurality of codes for executing the resource management protocol.

* * * * *